(12) United States Patent
Darke et al.

(10) Patent No.: US 11,275,860 B2
(45) Date of Patent: Mar. 15, 2022

(54) SYSTEM AND METHOD FOR SOFTWARE VERIFICATION

(71) Applicant: Tata Consultancy Services Limited, Mumbai (IN)

(72) Inventors: Priyanka Darke, Pune (IN); Bharti Chimdyalwar, Pune (IN); Avriti Chauhan, Pune (IN); Punit Shah, Pune (IN); Shrawan Kumar, Pune (IN); Mohammad Afzal, Pune (IN); Venkatesh Ramanathan, Pune (IN); Advaita Datar, Pune (IN); Asia Akhtar, Pune (IN); Tanha Shah, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 16/814,460

(22) Filed: Mar. 10, 2020

(65) Prior Publication Data

US 2021/0141914 A1    May 13, 2021

(30) Foreign Application Priority Data

Nov. 8, 2019    (IN) .............................. 201921045604

(51) Int. Cl.
*G06F 21/62* (2013.01)
*G06F 8/33* (2018.01)

(52) U.S. Cl.
CPC ............ *G06F 21/6209* (2013.01); *G06F 8/33* (2013.01)

(58) Field of Classification Search
CPC ................................ G06F 8/33; G06F 21/6209
See application file for complete search history.

(56) References Cited

U.S. PATENT DOCUMENTS

| 7,089,534 B2 | 8/2006 | Hartman et al. |
| 2006/0010428 A1* | 1/2006 | Rushby ............... G06F 11/3684 717/124 |

(Continued)

OTHER PUBLICATIONS

P.A. Buhr, "A Case for Teaching Multi-exit Loops to Beginning Programmers," 1985 [retrieved on Apr. 22, 2021], ACM SIGPLAN Notices, pp. 1-10, downloaded from <url>:https://dl.acm.org. (Year: 1985).*

(Continued)

*Primary Examiner* — S. Sough
*Assistant Examiner* — Stephen D Berman
(74) *Attorney, Agent, or Firm* — Finnegan, Henderson, Farabow, Garrett & Dunner LLP (57) ABSTRACT

A system and a method for verification of a source code are provided. There as many techniques available that can be used for verification of software codes, however, it is difficult to determine appropriate technique that can be utilized for verification of a given software code. In an embodiment, the system receives a source code encoded with one or more specifications to be verified. A static analysis of the source code is performed to identify program features of the source code. The program features may include, but are not limited to, multiple return paths, loops with an unstructured control flow, loops with arrays, short ranges and numerical loops. Based on the identification of the program features, verification techniques are applied to the source code for the verification. Each verification technique of the one or more verification techniques is applied for a predetermined period of time and in a predefined order.

19 Claims, 5 Drawing Sheets

(56) References Cited

U.S. PATENT DOCUMENTS

2006/0282806 A1 12/2006 Cadambi et al.
2006/0282807 A1* 12/2006 Ivancic ............... G06F 11/3608
716/106

OTHER PUBLICATIONS

Dirk Beyer et al., "Boosting k-Induction with Continuously-Refined Invariants," 2015 [retrieved on Apr. 22, 2021], CAV 2015: Computer Aided Verification pp. 622-640, downloaded from <url>:https://link.springer.com. (Year: 2015).*
Francesco Alberti et al., "SAFARI: SMT-Based Abstraction for Arrays with Interpolants," 2012 [retrieved on Apr. 22, 2021],CAV 2012: Computer Aided Verification pp pp. 679-685, downloaded from <url>:https://link.springer.com. (Year: 2012).*
Shrawan Kumar et al., "Property Checking Array Programs Using Loop Shrinking", 2018 [retrieved on Apr. 22, 2021], TACAS 2018: Tools and Algorithms for the Construction and Analysis of Systems pp. 213-231, downloaded from <url>:https://link.springer.com. (Year: 2018).*
Dirk Beyer et al., "Path Invariants," 2007 [retrieved on Apr. 23, 2021], PLDI '07: Proceedings of the 28th ACM SIGPLAN Conference on Programming Language Design and Implementation, pp. 300-309, downloaded from <url>:https://dl.acm.org. (Year: 2007).*
Daniel Kroening et al., "Loop summarization using state and transition invariants," 2013 [retrieved on Apr. 23, 2021], Form Methods Syst Des, pp. 221-261, downloaded from <url>:https://link.springer.com. (Year: 2012).*
Petr Muller et al., "Predator Hunting Party," 2015 [retrieved on Apr. 23, 2021], TACAS 2015: Tools and Algorithms for the Construction and Analysis of Systems pp. 443-446, downloaded from <url>:https://link.springer.com. (Year: 2015).*
Priyanka Darke et al., "Efficient Safety Proofs for Industry-Scale Code using Abstractions and Bounded Model Checking," 2017 [retrieved on Apr. 23, 2021], 10th IEEE International Conference on Software Testing, Verification and Validation, pp. 468-475, downloaded from <url>:https://ieeexplore.IEEE.org. (Year: 2017).*
Mike Czech et al. "Predicting rankings of software verification tools," 2017 [retrieved on Sep. 25, 2021], SWAN 2017: Proceedings of the 3rd ACM SIGSOFT International Workshop on Software Analytics, pp. 23-26, downloaded from <url>:https://dl.acm.org/. (Year: 2017).*
Vitaly Mordan, "Static Verification Results Visualization in the Context of SV-COMP," 2019 [retrieved on Sep. 25, 2021], The joint 4rd International Workshop on CPAchecker (CPA'19) and 9th Linux Driver Verification (LDV) Workshop, pp. 1-36, downloaded from https://cpa.sosy-lab.org. (Year: 2019).*
ThanVu Nguyen et al., Counterexample-Guided Approach to Finding Numerical Invariants, 2017 [retrieved on Sep. 25, 2021], ESEC/FSE 2017: Proceedings of the 2017 11th Joint Meeting on Foundations of Software Engineering, pp. 605-615, downloaded from <url>:https://dl.acm.org/. (Year: 2017).*
Tulsian, V. et al. "MUX: Algorithm Selection for Software Model Checkers," *Proceedings of the 11$^{th}$ Working Conference on Mining Software Repositories*, May 31-Jun. 7, 2014, Hyderabad, India; 10 pages.
Beyer, D. et al. "Strategy Selection for Software Verification Based on Boolean Features A Simple but Effective Approach," *8$^{th}$ International Symposium, International Symposium on Leveraging Applications of Formal Methods*, Nov. 5-9, 2018, Limassol, Cyprus; 16 pages.
Daniel, J. et al. "Predicate Abstraction in Program Verification: Survey and Current Trends," *2014 Imperial College Computing Student Workshop*, London, United Kingdom, Sep. 25-26, 2014; pp. 27-35.

* cited by examiner

SYSTEM AND METHOD FOR SOFTWARE VERIFICATION

PRIORITY CLAIM

This U.S. patent application claims priority under 35 U.S.C. § 119 to: India Application No. 201921045604, filed on Nov. 8, 2019. The entire contents of the aforementioned application are incorporated herein by reference.

TECHNICAL FIELD

The embodiments herein generally relate to software verification, and, more particularly, to method and system for software verification.

BACKGROUND

Computer programs, also referred to as software programs or source codes, include codes written in a programming language to perform certain tasks in a computing device on which the computer program is executed. Examples of computing devices include, but are not limited to, a laptop, personal digital assistant (PDA), computer, mobile phone, and so on.

Verification of the source codes is of utmost importance for safe running of software programs. For example, it is imperative to perform defect detection in all kinds of software programs. However, it is considered to be a challenging task as no single known technique succeeds on all software programs or software codes.

A known technique for verification of software programs includes model checking. Bounded Model checking (BMC), for example, can find errors in programs with loops of known small bounds. However, a technical challenge associated with verification of software codes using BMC is that it cannot prove the safety of programs with loops of large or unknown bounds.

SUMMARY

Embodiments of the present disclosure present technological improvements as solutions to one or more of the above-mentioned technical problems recognized by the inventors in conventional systems. For example, in one embodiment, a method for verification of software codes is provided. The method includes, receiving a source code encoded with one or more specifications to be verified, via one or more hardware processors. Further the method includes performing, via the one or more hardware processors, static analysis of the source code to identify one or more program features of the source code, the one or more program features comprising at least one of multiple return paths, loops with an unstructured control flow, loops with arrays, short ranges and numerical loops. Furthermore the method includes applying one or more verification techniques associated with the one or more program features to the source code for the verification, via the one or more hardware processors, wherein each verification technique of the one or more verification techniques is applied for a predetermined period of time and in a predefined order.

In another aspect, a system for verification of software codes is provided. The system includes one or more memories; and one or more first hardware processors, the one or more first memories coupled to the one or more first hardware processors, wherein the one or more first hardware processors are configured to execute programmed instructions stored in the one or more first memories, to receive a source code encoded with one or more specifications to be verified. Further, the one or more first hardware processors are configured to execute programmed instructions to perform static analysis of the source code to identify one or more program features of the source code, the one or more program features comprising at least one of multiple return paths, loops with an unstructured control flow, loops with arrays, short ranges and numerical loops. Also, the one or more first hardware processors are configured to execute programmed instructions to apply one or more verification techniques associated with the one or more program features to the source code for the verification, wherein each verification technique of the one or more verification techniques is applied for a predetermined period of time and in a predefined order.

In yet another aspect, a non-transitory computer readable medium for a method for verification of software codes is provided. The method includes, receiving a source code encoded with one or more specifications to be verified, via one or more hardware processors. Further the method includes performing, via the one or more hardware processors, static analysis of the source code to identify one or more program features of the source code, the one or more program features comprising at least one of multiple return paths, loops with an unstructured control flow, loops with arrays, short ranges and numerical loops. Furthermore the method includes applying one or more verification techniques associated with the one or more program features to the source code for the verification, via the one or more hardware processors, wherein each verification technique of the one or more verification techniques is applied for a predetermined period of time and in a predefined order.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

There are multiple techniques for software verification and each technique performs differently for different types of software programs or source codes. Herein, 'verification' may refer to finding error paths as well as proving validity of the input properties of the source codes. The effectiveness of a verification technique is program and property dependent. Hence, without knowledge of the verification techniques that may be suitable for a given software program, the process of verification may be inefficient, cumbersome and time consuming.

Further, loops are a major bottleneck for efficient software verification, however, a single technique may not work for different types of loops that can be written for a software program. For example, bounded model checking (BMC) can find errors in programs with loops of known small bounds, but cannot prove the safety of programs with loops of large or unknown bounds. Thus, to be able to verify a variety of software programs with limited resources, conventional verifiers (or verification systems) incorporate portfolios of complementary techniques. Further, such conventional verifiers define feature specific strategies, or sequences of feature specific verification techniques tried one after another until the input program is verified. Such a strategy-based verification may be helpful in an improved applicability of formal verification in practice.

Referring to the following example (Example: 1) having loop which copies array elements from one array to another.

Example 1

```
int main( ) {
    int a1[100000];
    int a2[100000];
    int a;
    for ( a = 0 ; a < 100000 ; a++ ) {
        a1[a] = nondet_int( );
    }
    int i;
    for ( i = 0 ; i < 100000 ; i++ ) {
        a2[i] = a1[i];
    }
    int x;
    for ( x = 0 ; x < 100000 ; x++ ) {
        assert( a1[x] == a2[x] ); // property to be verified
    }
    return 0;
}
```

In the present example (Example:1), as the loop bound is too large, bounded model checking does not scale on the software program. Thus, rather than bounded model checking, which is not a suitable technique for verification of this program, one or more verification techniques should be selected which can handle property verification in presence of arrays accessed in loop.

Various embodiments disclosed herein provide software verification method and system that employs strategy-based verification of software program. The disclosed method and system automatically selects most appropriate technique(s) for verification of source code based on the structure of the loops and the values of variable selected by them. For example, in an embodiment, a strategy selection method is proposed which performs inter-procedural control flow and light-weight loops-based static analysis to select a best possible sequence of available verification techniques for verifying given input program. Said sequence of the available verification techniques may hereinafter be referred to as a 'strategy'. The disclosed method facilitates in mapping an input software program to a strategy (or sequence of verification techniques) that may perform well for the given software program type.

In an embodiment, a verification system is disclosed that employs a strategy based portfolio verifier aimed at checking for the unreachability of errors for all possible program executions or checking for the reachability of errors in programs with loops, since loops form a bottleneck for effective formal verification. The disclosed system selects a verification strategy for a program (or a software code) by performing lightweight analysis of loops in the program. In an embodiment, the system utilizes various program features for classifying the programs to learn or select a verifier or a strategy. The disclosed system implements a wide variety of techniques to verify different types of loops, as will be described further in the description below.

In an embodiment, the disclosed method employs a static analysis and includes a plurality of techniques in its portfolio. Said techniques include, but are not limited to, array pruning, explicit state model checking, two loop invariant generation techniques and an interval analysis. The analysis of the software code by using the aforementioned techniques facilitates in identifying program features and variables.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 6, where similar reference characters denote corresponding features consistently throughout the figures, there are shown preferred embodiments and these embodiments are described in the context of the following exemplary system and/or method.

Figure 1:
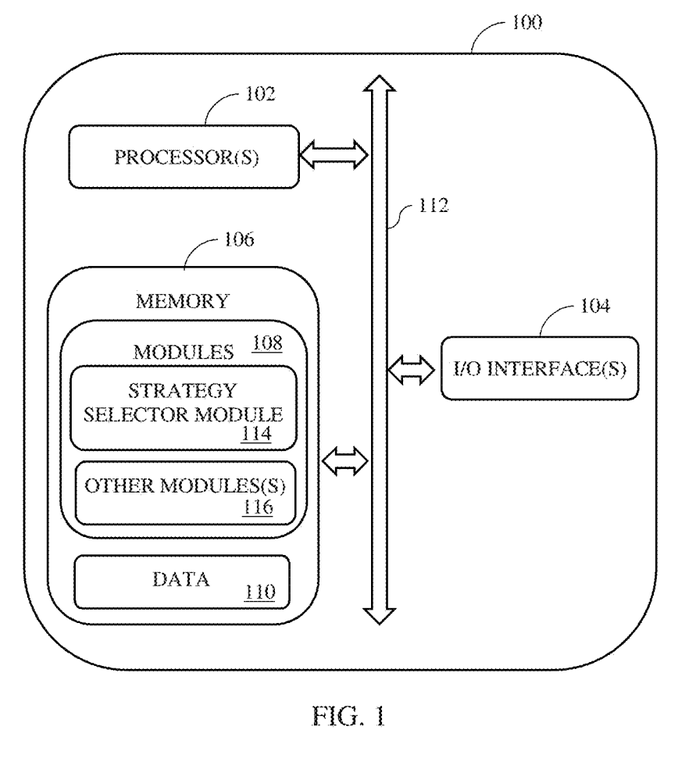
FIG. 1 illustrates a block diagram of a system for software verification, in accordance with an embodiment of the present disclosure.

FIG. 1 illustrates a block diagram of a system 100 implementing software verification in a program written in a programming language, in accordance with an implementation of the present subject matter. The software verification system 100 may be implemented in a computing device. Examples of the computing device include, but are not limited to, mainframe computers, workstations, personal computers, desktop computers, minicomputers, servers, multiprocessor systems, laptops, a cellular communicating device, such as a personal digital assistant, a smart phone, and a mobile phone; and the like. The software verification system 100, implemented using the computing device, includes one or more hardware processor(s) 102, IO interface(s) 104, and a memory 106 coupled to the processor 102. The processor 102 can be a single processing unit or a number of units. The hardware processor 102, the memory 106, and the IO interface 104 may be coupled by a system bus such as a system bus 112 or a similar mechanism. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 106.

Functions of the various elements shown in the figures, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or customized, may also be included.

The IO interfaces 104 may include a variety of software and hardware interfaces, for example, interface for peripheral device(s), such as a keyboard, a mouse, an external memory, and a printer. Further, the IO interfaces 104 may enable the computing device to communicate with other computing devices, such as a personal computer, a laptop, and like.

The memory 106 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 106 may also include module(s) 108 and data 110.

The module(s) 108 include routines, programs, objects, components, data structures, etc., which perform particular tasks or implement particular abstract data types.

The modules 108 may include routines, programs, objects, components, data structures, and so on, which perform particular tasks or implement particular abstract data types. The modules 108 may include programs or computer-readable instructions or coded instructions that supplement applications or functions performed by the system 100. The modules 108 may also be used as, signal processor(s), state machine(s), logic circuitries, and/or any other device or component that manipulates signals based on operational instructions. Further, the modules 108 can be used by hardware, by computer-readable instructions executed by the one or more hardware processors 102, or by a combination thereof. In an embodiment, the modules 108 can include various sub-modules, for example, a strategy selector module 114 and other module(s) 116. The other module(s) 116 may include programs or coded instructions that supplement applications and functions of the computing device.

The data 110, amongst other things, serves as a repository for storing data processed, received, and generated by one or more of the module(s) 108. The data 110 includes, for example, software verification data associated with strategies and techniques, and other data. The other data includes data generated as a result of the execution of one or more modules in the other module(s).

In an embodiment, the computing device may receive a source code for verification. The source code may be referred to as a program or a software program, hence the terms source code, program, and software program shall be used interchangeably throughout the description. In an embodiment, the computing device may receive the source code from a compilation module. In various embodiments, the compilation module may be internal or external to the computing device.

According to an implementation of the present subject matter, systems and methods for verification of a software program or source code is described. The source code may be understood as a computer program written in a programming language. The systems and methods can be implemented in a variety of computing devices. The computing devices include, but are not limited to, desktop computers, hand-held devices, laptops or other portable computers, and the like. In one implementation, the systems and methods implementing software verification may be provided for software verification in programs written using programming languages including, but not limited to, C, C++, VC++, C#, and the like.

In one implementation, the source code encoded with one or more specifications to be verified may be received. The disclosed system may output verification successful (S) if the program specification or properties hold for all possible program executions, verification failed (F) if any of the program properties does not hold for at least one program execution, and unknown (U) otherwise. A detailed architecture diagram of the disclosed system is illustrated and explained in FIG. 2.

Figure 2:
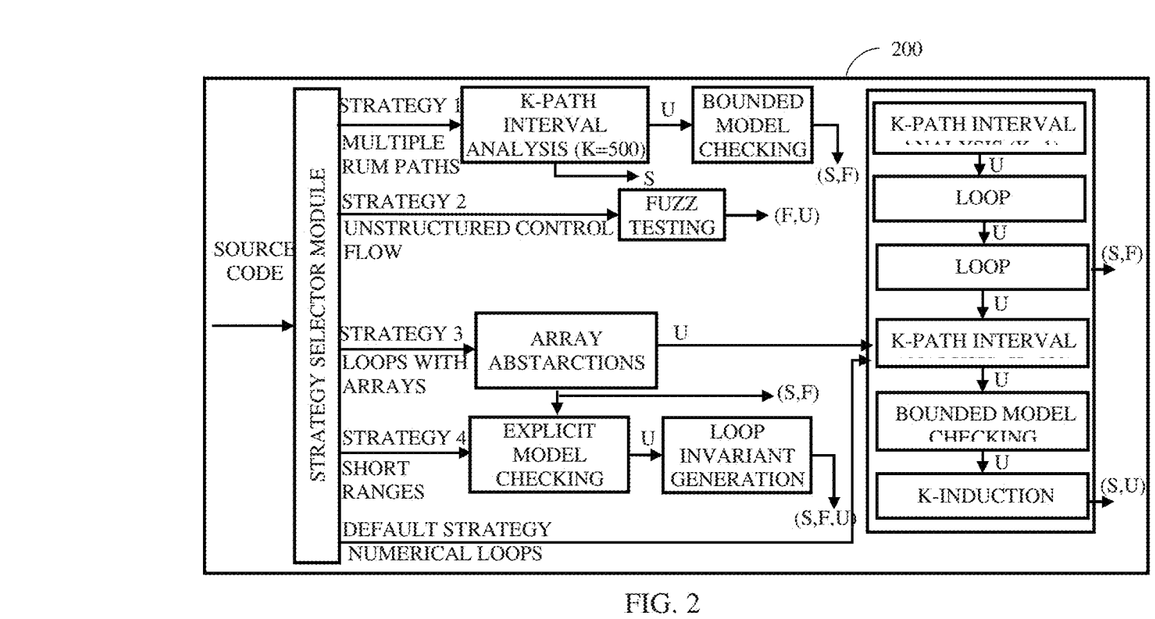
FIG. 2. Illustrates an architecture diagram of the system (of FIG. 1) for software verification, in accordance with an embodiment of the present disclosure.

Referring to FIG. 2, an architecture diagram of a system 200 for software verification is illustrated in accordance with an example embodiment. The architecture diagram is shown to include a strategy selector module 202 (referred to as strategy selector module 114 in FIG. 1).

The strategy selector module 202 performs a light-weight structural analysis of loops and an interval analysis of input values read in loops, to determine a sequence (or order) of suitable verification techniques or a strategy for a given software program. In other words, the strategy selector 202 facilitates in determining verification technique(s) that may work well on the given software program based on loops and the program control flow. The strategy selector module 202 performs structural analysis of inter-procedural control flow and loops to decide a strategy (or a sequence of suitable verification techniques).

In an embodiment, the strategy selector module 202 checks for the following strategies in the given order: (1) Strategy 1— for loops with multiple return paths, (2) Strategy 2— for loops with an unstructured control flow, (3) Strategy 3— for loops processing arrays, (4) Strategy 4— for loops with inputs of short ranges or discrete values, and (5) a default strategy—for all remaining loops including numerical loops. Herein, the verification techniques in each of the strategies may be applied for a predetermined period of time and in a predefined order. Each of the aforementioned strategies are explained in further detail in the description below:

Strategy 1: For software programs containing multiple procedures and procedures with multiple return paths, where the return value of a procedure call decides the control-flow of the program, the verification techniques including inter procedural verification techniques sequence of verification techniques are selected for the verification of the program. The inter-procedural verification techniques for the verification of the program with multiple return paths may be applied in a predefined order, for example, interval analysis followed by bounded model checking. In an embodiment, the interval analysis may include k-path interval analysis, for example k-path interval (k=500). Upon verification of the software program, the status may be one of Verification Successful (S) or Verification Failed (F). If, however, the software program is not verified (Status is Unknown (U)), the process flow is passed to strategy selector to check with other strategies, for example, Strategy 2, in the following possible order.

Strategy 2: If the input software program contains a loop formed by unstructured forward and backward goto edges, random fuzz testing is applied to show the presence of errors (Status: Verification Failed (F)) or inconclusive verification result (Status: Unknown (U)). Inputting massive amounts of random data, called fuzz, to test the input program in an attempt to make it crash or fuzz testing or random testing performs, well on such programs by virtue of algorithms that achieve a high branch-pair coverage. Some of these algorithms also evolve tests from the initial input test cases based on the execution paths of the input program. These can be applied in this strategy to verify the input program and the specification.

Strategy 3: For software codes processing arrays in loops, efficient and scalable array abstraction techniques are selected. The abstraction techniques selected may include array pruning and loop shrinking wherein it may be sufficient to verify the input specification with respect to a subset of the elements of the input arrays in the program instead of the entire array for better efficiency and scalability, or it may be sufficient to validate the input specification with respect to a few iterations of the loop(s) in the program. In an embodiment, the abstraction techniques selected may be applied in a predefined order, namely, array pruning followed by loop shrinking. Said abstraction techniques validate user properties or assertions for a sufficient subset of array elements to verify the program with an improved scalability. In an embodiment, the abstraction techniques may be applied for a predetermined period of time. If these techniques run out of time or memory (Status: Unknown U), the default strategy is applied over the program as explained later.

Strategy 4: For software programs which have small state spaces by virtue of loops with inputs of short ranges or discrete values, explicit state model checking technique and loop invariant generation technique is selected. If explicit state model checking cannot scale, two loop invariant generation techniques are applied simultaneously and a first result produced by either is output. One invariant generation technique uses dynamic analysis, specifically fuzz testing, and program syntax analysis to guess and check candidate loop invariants. The second invariant generation technique is a Counter-Example Guided Loop Abstraction Refinement (CEGLAR) technique. It 'havocs' the output variables of, and applies induction to, each loop containing user properties to abstract the loop. If this abstraction produces a counterexample, then the system guesses and checks likely loop invariants such that they eliminate all paths leading to the counter-example. Said counter-example guided invariant guess check-guess cycle is repeated until the error is found (F) or the property is proved to be safe (S). This technique is a sound abstraction and works well in practice, but is incomplete and may not terminate with a solution.

Default Strategy: This strategy is mainly designed for verifying programs with the commonly found numeric loops, and also supports programs without loops. The default strategy applies a sequence of one or more default verification techniques in the reducing order of scalability (as shown in FIG. 2). If a technique cannot verify the input program with respect to the given property, the next technique in the sequence of the one or more default verification techniques is applied. The sequence of default verification techniques selected in this strategy includes k-Path Interval Analysis (k=1), Loop Abstraction (specifically loop abstraction followed by bounded model checking or LABMC), Loop Summarization, k-Path Interval Analysis (k=500), Bounded Model Checking, and k-induction (refer to FIG. 2). K path interval analysis (k=1) represents a less accurate but more scalable k path interval analysis, while k path interval analysis (k=500) represents a more accurate but less scalable and less efficient k path interval analysis. Each of the aforementioned one or more default verification techniques of the default strategy are explained below.

Interval Analysis: The interval analysis, for instance, k-path interval analysis is an extension of the interval domain. It maintains the path-wise ranges of variables inter-procedurally, along a configurable k number of paths at each program point. Thus configuring k impacts the precision and scalability of the analysis—it can be imprecise but scalable for a small k, and vice versa for higher values of k. As seen in FIG. 2, the k-path interval analysis is invoked twice, first with k=1 aiming at high scalability, and later with a heuristically chosen k=500 for a higher precision. The first call is also used to compute loop bounds for a sound BMC as explained later.

Loop Abstraction. After the interval analysis, the disclosed system 200 applies Loop Abstraction followed by BMC (LABMC) to the input program by which each loop is replaced by an abstract loop of known small bounds so that BMC scales well on that program. LABMC is a sound abstraction and can verify if the input property holds. Moreover, for precise abstractions, the disclosed system 200 can verify property failures. Thereafter, the system applies BMC to the input program with the bounds produced by the interval analysis to show (the absence of) errors.

Loop Summarization. At this stage, the system 200 applies a technique to a subset of loops that analyses the interleaving of unique paths within the loop to produce a disjunctive summarization of the loop to find errors or proofs.

Bounded Model Checking. If loop summarization is inconclusive and generates Unknown (U), the system performs a heuristic search for bounds that calls BMC multiple times asserting if all loops in the original program have been unwound sufficiently to (in)validate the input property. In an example embodiment, the system uses CBMC with the SAT solver Glucose for BMC.

k-Induction. As a last step in default strategy, the system applies k-induction to loops to prove properties.

In an embodiment, the static analysis is performed by carrying out analysis of the one or more program features in a structured sequential manner, as described above (for instance, the sequence of Strategies 1, 2, 3, 4 and default strategy). However, it will be understood that in alternate embodiments, the static analysis can be performed by carrying out analysis of the one or more program features in parallel, for instance, strategy 2 performed in parallel with strategy 3, and so on.

Figure 3:
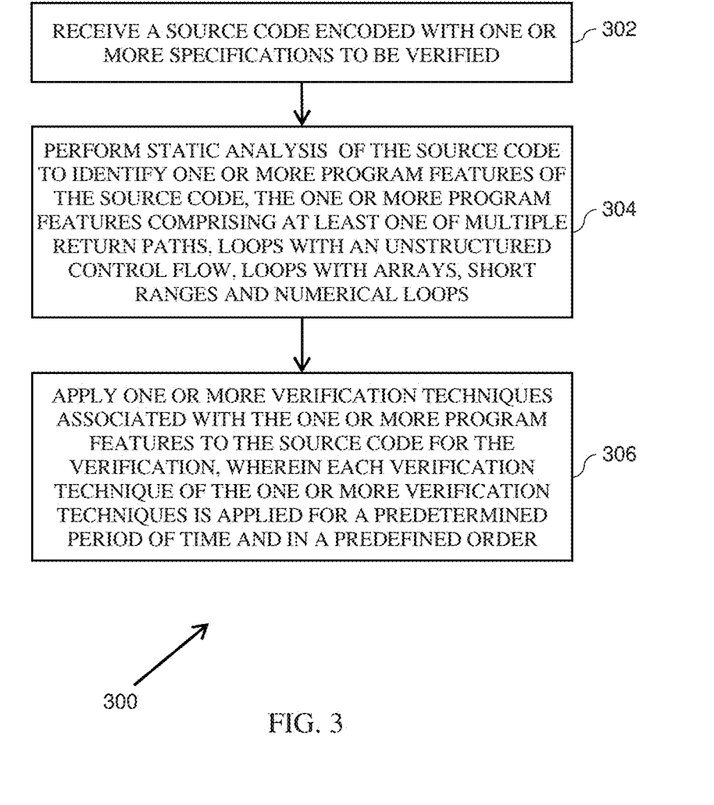
FIG. 3 illustrates a flow diagram of a method for software verification, in accordance with an example embodiment of the present disclosure.

FIG. 3 illustrates an example flow diagram of a method 300 for software verification in accordance with embodiments of the present disclosure. The method 300 depicted in the flow chart may be executed by a system, for example, the system, 100 of FIG. 1 and/or the system 200 of FIG. 2. In an example embodiment, the system 100/200 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100/200. However, the operations of the method 300 can be described and/or practiced by using any other system.

At 302, the method 300 includes receiving, via one or more hardware processors (for example processor 102 of FIG. 1) a source code encoded with one or more specifications to be verified. Herein, the term 'specification' refers to a property of the input program which should be satisfied in all possible executions of that program. For example, in code example 2 starting at line number 1 the property specification is the condition ((x %3)==0) in the last line. This condition is expected to be satisfied for all runs of example 2 at the given location in the program. For example, at 304, the method 300 includes performing, via the one or more hardware processors, static analysis of the source code to identify one or more program features of the source code. The one or more program features may include, but are not limited to, multiple return paths, loops with an unstructured control flow, loops with arrays, short ranges and numerical loops. At 306, the method 300 includes applying, based on the identification of the one or more program features, one or more verification techniques to the source code for the verification via the one or more hardware processors. Each verification technique of the one or more verification techniques is selected and applied for a predetermined period of time and in a predetermined order. The process of strategy selection for verification of software program is explained further using few examples (Examples 2-6).

For programs with a loop formed by unstructured forward and backward goto, strategy selector module 202 selects fuzz testing (Strategy 2). Below example does not contain function calls (Strategy 1) and satisfies criterion for strategy 2.

Example 2

```
unsigned int x, y = 1;
label 1:
if( * ) {
    if( (x% 3) == 1){
        x += 2; y =0 ;
        label 2:
        goto label 1;
    }
    else if ( (x %3 ) = = 2){
        x = x +1; y =0;
        goto label 2;
    }
}
if (y ==0)
    assert ( (x%3 ) == 0) //property to be verified
```

For program with loops accessing array elements, strategy selector module 202 selects array abstraction technique (or strategy 3), followed by default strategy. The below example satisfies this criterion because the input program does not contain function calls or return statements (suiting strategy 1), or unstructured control flow (suiting strategy 2). It contains an array element a[i] being accessed in while loop (as suiting Strategy 3). The program is verified by the selected array abstraction technique.

Example 3

```
int a[100000];
int x, max = 0, i =0 ;
while ( i < 100000 ) {
    if ( a[i] > max ) {
        max = a[i];
    }
    i = i + 1;
}
for(x=0 ; x<100000 ; x++) {
    assert( a[x] <= max ); //property to be verified
}
```

For programs with loops that contain small input ranges, the strategy selector module 202 selects Strategy 4. In the below example, ranges of variables input and a1, are [1,4] and [0,5] respectively, which are small ranges, thus this example falls under this criteria, and this program does not contain function calls and returns (suiting Strategy 1), unstructured control flow (suiting Strategy 2), arrays (suiting Strategy 3). This software program is verified by explicit state model checking technique.

Example 4

```
a1 = 0;
while(1){
    input = *;
    if(input >=1 && input < 4){
        if(a1==0 && input ==2)
            a1 = 3;
        else
            a1 = 5;
    }
    assert(a1 == 3); //property to be verified
}
```

For programs having loops, which linearly modify numerical variables, strategy selector selects the default strategy because it does not contain function calls (corresponding to Strategy 1), complex control flow in the program (fitting Strategy 2), arrays (fitting Strategy 3), or inputs of short ranges (suiting Strategy 4). This program is verified by the loop abstraction technique in the default strategy.

Example 5

```
unsigned int x = 0;
while (x < 0x0ffffff) {
    x += 2;
}
assert(!(x % 2)); //property to be verified
```

For the programs with multiple procedures having multiple return paths, strategy selector module 202 selects, k-path interval analysis with k>1. In the below example (example 6), the procedure lock has two return statements and at the call point of lock the return value is used inside the condition after this call. At the call location of lock( ) function, two value paths are reachable, one is [n=0,m=0] and the other is [n=nonzero, m=1]. To decide precisely, if the unlock( ) function gets called or not, maintaining all value paths at the return of lock is necessary. Hence k-path interval analysis with k>1 gets selected here.

Example 6

```
m=0
void main( )    {
    int n=lock( )
    if(n!=0)
```

-continued

```
        unlock( );
        assert(m==1);
    }
    int lock( ){
        int t=nondet( );
        if(t!=0){
            m=1;
            return t;
        }
        else
            return 0;
    }
    void unlock( ) { m=0; }
```

Herein, it will be understood that although the present subject matter has been defined in reference with programs written in C language, it will be understood that the computing device implementing the software verification in programs written using other programming languages, albeit with few modifications.

The disclosed embodiments have been implemented in a system that configures a portfolio verifier of C programs, and results of verification are presented below.

Experimental Results:

The disclosed system embodies a reachability verifier for C programs that checks that the function_VERIFIER_error( ) is never called in the input program. Same may be specified in a property file with a prp extension in the following format: CHECK(init(main( )),LTL(G!call(_VERIFIER_error( ))))

A tool embodying the disclosed system is a command line tool that works on the GNU/Linux operating system. For a 64-bit architecture, the tool accepts the 64 bit option, it considers a 32-bit architecture by default. A sample command to check the program ex.c with the property file a.prp is as follows:

VeriAbs/scripts/veriabs-property-file a.prp ex.c

VeriAbs displays the verification result on the standard output

The tool embodying the disclosed system was tested on ReachSafety™, a reachability verification category. ReachSafety™ comprises of 3831 diverse C programs divided into 10 sub-categories-Arrays, BitVectors, ControlFlow, ECA, Floats, Heap, Loops, ProductLines, Recursive and Sequentialized, contributed by researchers and practitioners. Table 1, shows the suitable techniques that are selected based on the defined criteria and the contribution of each technique for verification of these benchmarks

TABLE 1

| Selection Criteria/Techniques | Accessing Arrays | Linear modification to variables | Short input range | Statically known loop bound | Unstructured control flow | Others | % Analyzed Programs |
|---|---|---|---|---|---|---|---|
| Array Abstraction | Yes | | | | | | 6.43 |
| Loop Abstraction | Yes | Yes | | | | Yes | 13.65 |
| Loop invariant generation | | | Yes | | | | 7.15 |
| Explicit state model checking | | | Yes | | | | 33.38 |
| Bounded model Checking | Yes | Yes | | Yes | | Yes | 30.73 |
| Interval analysis | Yes | Yes | | | | Yes | 4.16 |
| Others(K-Induction, Fuzz Testing, Loop Summarization) | Yes | Yes | | | Yes | Yes | 4.51 |

In order to evaluate the effectiveness of the tool, two analyses are presented over the ReachSafety™ benchmarks—first, a program-by-program analysis is performed to illustrate the contribution of each technique in the tool to verify the programs. Thereafter, a one-on-one comparison of the tool against the six other tools is performed. The analysis shows that there is a need for portfolio verifiers in order to solve a variety of programs. The tools were executed by the competition organizer on a machine with a GNU/Linux operating system (x86 64-Linux, Ubuntu 18.04) and resource limits of 15 GB (14.6 GiB) of RAM, 15 min of CPU time, and 8 CPU cores.

Figure 4:
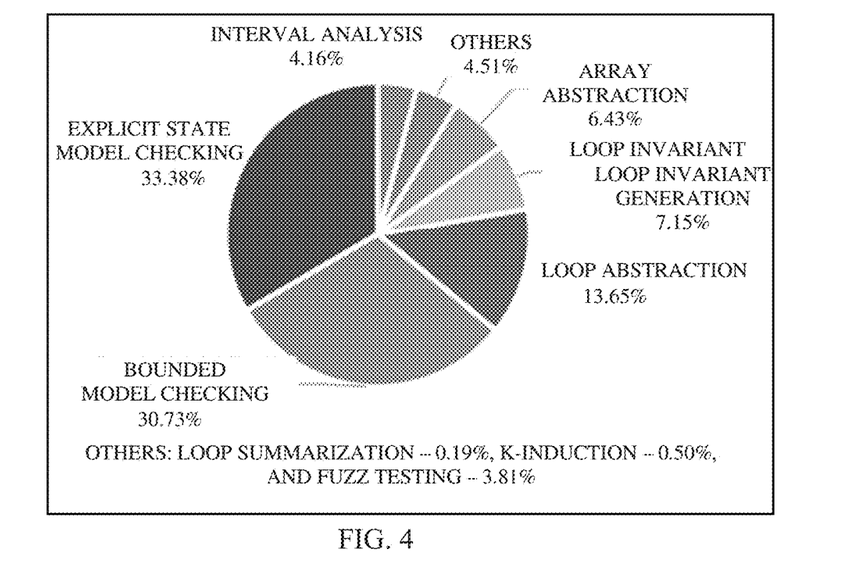
FIGS. 4-6 illustrate comparative analysis of experimental results of software verification by the system of FIGS. 1/2 vis-à-vis known systems, in accordance with an example embodiment of the present disclosure.

Technique-wise Contribution: The disclosed tool successfully verified 83% of the total benchmarks in ReachSafety™. Each ReachSafety™ program and its results were analyzed to understand the contribution of each technique (and hence, each strategy) in the disclosed tool. The percentage distribution of programs-solved-by technique in the disclosed tool is shown in FIG. 4. Findings: The data in FIG. 4 shows that when combined with strategy selection, classic techniques like explicit state model checking (for programs with small state spaces) and BMC (with bounds search) are very powerful—they have contributed to the verification of more than 60% programs in ReachSafety™. However, for the remaining 40%, several specialized techniques were needed to cater to program features like arrays in loops, and numeric loops with large or unknown bounds. This strengthens the claim that a variety of techniques is needed to handle diverse set of programs.

Category-Level Analysis: The disclosed tool is compared with known tools such as, CPA-Seq™, PeSCo™, and UAutomizer™. CPA-Seq™ is a portfolio verifier on top of the CPAchecker framework. It selects a verification strategy for a program by looking at the input property followed by the code structure. PeSCo uses machine learning for strategy selection. It uses the CPAchecker framework in six different configurations for verification. UAutomizer is a program verifier that uses an automata-based CEGAR approach with a single strategy for refinement. It uses techniques like predicate analysis and interpolation.

Figure 5:
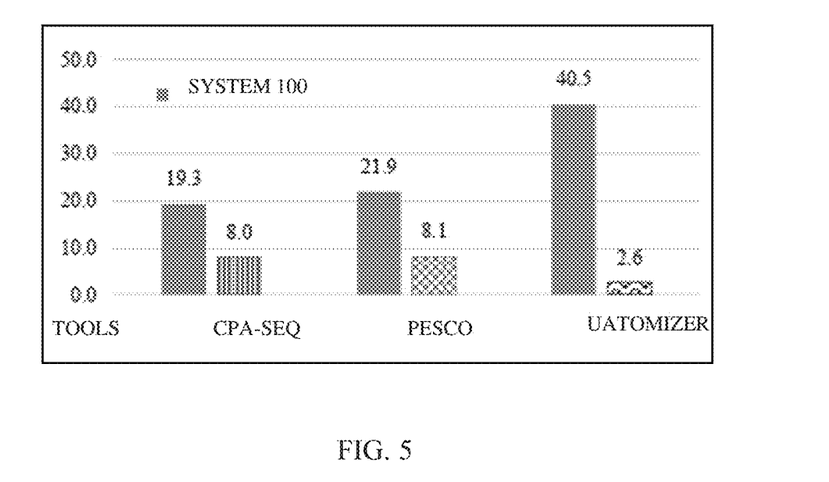

FIG. 5 shows the percentage of mutually exclusive programs verified by each best performer compared to disclosed tool. For example in FIG. 5, the first bar shows that, of the programs verified by disclosed tool in the disclosed tool category, 19.3% were not verified by CPA-Seq, and the second bar shows that, of the programs verified by CPA-Seq, 8% were not verified by disclosed tool.

Findings: CPA-Seq verified 8% programs that VeriAbs did not—we believe this is by virtue of techniques not a part of VeriAbs, like value and predicate analyses with CEGAR, and block abstraction memoization. PeSCo uses CPA-Checker as well, thus its comparison with VeriAbs bears results similar to CPA-Seq. Unlike CPA-Seq and PeSCo, UAutomizer does not use a strategy selection in the abstraction or the refinement phases. Its results showcase the strength of strategy selection.

Figure 6:
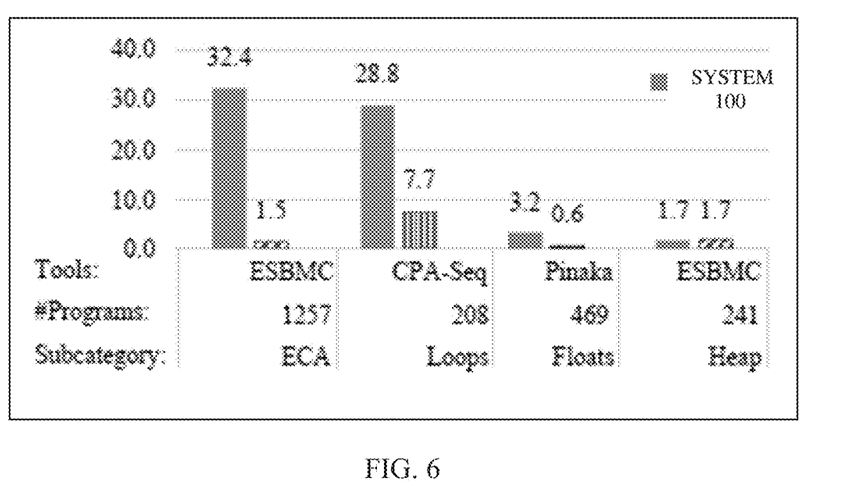

Sub-Category-Level Analysis: FIGS. 6A and 6B shows the comparison of disclosed tool with the known tools. The disclosed tool performed better in four subcategories as compared to the portfolio verifier, CPASeq, and non-portfolio verifiers, ESBMC-kind and Pinaka (shown in FIG. 6A). ESBMC-kind is a context bounded model checker with abilities of k-induction strengthened with interval analysis to prove properties. Pinaka is a symbolic execution engine that uses incremental SAT solving with eager state infeasibility checks. On the other hand, Findings: The disclosed tool verifies 543 programs across subcategories that are not verified by the other best tools. The distribution of techniques in disclosed tool verifying these programs is similar to the category wise distribution presented in FIG. 4. Here too, explicit state model checking and bounded model checking supported by strategy selection have verified most programs. Next 328 programs not verified by the disclosed tool but verified by the respective other tools were analyzed. A majority of these programs contain inputs of large ranges with intensive control-flow. Overall, one can see that portfolio verifiers enjoy a broader applicability by virtue of their portfolios.

Various embodiments disclosed herein provides method and system for software verification. The disclosed system accepts source code with the specification to be verified and a set of available verification techniques to be applied for the verification of program. It outputs a sequence of strategies of techniques or a sequence of techniques suitable for the verification of the input program. For example, the disclosed system performs Inter-Procedural Control-Flow Analysis by performing static analysis of the input programs to detect if there exists any procedure with multiple return paths and the return value of this procedure decides the control flow of the program at its call point. Further, the disclosed system performs a light weight structural analysis of the input programs to detect different types of loops. In an embodiment, the system performs array accesses detection by analyzing program to identify if it contains loops in which arrays are read or modified. The system analyzes program to detect loops that contains some linear modifications to numerical variables. In addition, for Unstructured Control Flow, the system analyzes input code for checking loops formed by unstructured forward and backward goto edges or other unstructured control flow. The system detects programs for loops with inputs of short ranges or discrete values, having small state spaces using static analysis like interval analysis. Also, for loop bound detection, the system performs interval analysis to detect maximum possible loop unwinding bound for the input program. The bound thus computed could be used as an input to the bounded model checker in the default strategy.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for verification of a source code, comprising:
   receiving a source code encoded with one or more specifications to be verified, via one or more hardware processors;
   performing, via the one or more hardware processors, static analysis of the source code to identify one or more program features of the source code, the one or more program features comprising at least one of multiple return paths, loops with an unstructured control flow, loops with arrays, loops with inputs of discrete values and numerical loops;

performing a structural analysis of a plurality of loops and an interval analysis of input values read in the plurality of loops to determine a predefined order of a plurality of verification techniques to verify the source code based on the plurality of loops and a program control flow;

applying the plurality of verification techniques associated with the one or more program features to the source code for the verification, via the one or more hardware processors, wherein the source code comprises the loops with inputs of discrete values and numerical loops, wherein each verification technique of the plurality of verification techniques is applied for a predetermined period of time and in the predefined order, wherein a verification technique from the plurality of verification techniques for verification of the source code comprising the loops with inputs of discrete values comprises an explicit state model checking technique and loop invariant generation techniques and the loop invariant generation techniques result in loop abstraction, wherein when the explicit state model checking technique cannot scale, two loop invariant generation techniques are applied simultaneously, wherein one of the loop invariant generation techniques uses fuzz testing and program syntax analysis to guess and check candidate loop invariants, and another of the loop invariant generation techniques is a counter-example guided loop abstraction refinement (CEGLAR) technique that havocs output variables of each loop subject to application of the another of the loop invariant generation techniques and applies induction to each loop subject to application of the another of the loop invariant generation techniques containing user properties to generate an abstracted loop; and displaying a verification result as one of a verification successful (S) when the one or more specifications hold for all program executions, a verification failure (F) when any specification from the one or more specifications failed to hold for at least one program execution, and unknown (U) when one or more of the specifications is not verified or the verification technique run out of time or memory.

2. The method of claim 1, further comprising selecting a plurality of default verification techniques upon elapse of a respective predetermined period of time to verify a corresponding property by the plurality of verification techniques.

3. The method of claim 1, wherein the source code comprises the multiple return paths, wherein the plurality of verification techniques comprises one or more inter procedural verification techniques for the verification of the source code with the multiple return paths, the one or more inter procedural verification techniques comprising the interval analysis followed by bounded model checking, wherein when the source code is not verified with the verification result as unknown (U), then a next verification technique in the predefined order is determined.

4. The method of claim 1, wherein a verification technique, from the plurality of verification techniques, for verification of the source code having the one or more loops with the unstructured control flow comprises random testing.

5. The method of claim 1, wherein a verification technique, from the plurality of verification techniques, for verification of the source code comprising the loops with arrays comprises a plurality of array abstraction techniques, wherein the plurality of array abstraction techniques comprises array pruning followed by loop shrinking, wherein the specification is verified with respect to a subset of array elements in the source code or the specification is verified with respect to loop iterations, wherein the plurality of array abstraction techniques validate user properties or assertions for a subset of array elements to verify the source code with an improved scalability, wherein when the array abstraction techniques run out of time and memory with the verification result as unknown (U), then a default verification technique is applied on the source code.

6. The method of claim 1, wherein when the abstracted loop produces a counter-example, loop invariants are checked to eliminate all paths leading to the counter-example and continued until the verification results in success (S) or failure (F).

7. The method of claim 2, wherein the plurality of default verification techniques comprises carrying out an execution sequence comprising interval analysis including a k-path interval analysis invoked twice, first with k=1 aiming at scalability and later with k=500 for precision, loop abstraction followed by bounded model checking (BMC) in which each loop is replaced by an abstract loop of known bounds, apply the BMC to the source code with bounds produced by the interval analysis to show absence of errors, loop summarization to analyze interleaving of unique paths within a respective loop to produce a disjunctive summarization of the respective loop to find errors or proofs, the bounded model checking is applied when the loop summarization is inconclusive and generates the unknown (U) verification result and performs a heuristic search for bounds that calls the BMC multiple times asserting if all loops in the source code is unwound to invalidate an input property of the source code, and k-induction.

8. The method of claim 1, wherein the static analysis is performed by carrying out an analysis of the one or more program features in a predefined sequential order.

9. The method of claim 1, wherein the static analysis is performed by carrying out an analysis of the one or more program features in parallel.

10. A system for verification of a source code comprising:
at least one memory; and
one or more hardware processors, the at least one memory coupled to the one or more hardware processors wherein the one or more hardware processors are capable of executing programmed instructions stored in the at least one memory to:
receive a source code encoded with one or more specifications to be verified;
perform static analysis of the source code to identify one or more program features of the source code, the one or more program features comprising at least one of multiple return paths, loops with an unstructured control flow, loops with arrays, loops with inputs of discrete values and numerical loops;
perform a structural analysis of a plurality of loops and an interval analysis of input values read in the plurality of loops to determine a predefined order of a plurality of verification techniques to verify the source code based on the plurality of loops and a program control flow;
apply the plurality of verification techniques associated with the one or more program features to the source code for the verification, wherein the source code comprises the loops with inputs of discrete values and numerical loops, wherein each verification technique of the plurality of verification techniques is applied for a predetermined period of time and in the predefined order, wherein a verification technique from the plurality of verification techniques for verification of the source code comprising the loops with inputs of discrete values comprises an explicit state model checking technique and loop invariant generation techniques and the loop invariant generation techniques result in loop abstraction, wherein when the explicit state model checking technique cannot scale, two loop invariant generation techniques are applied simultaneously, wherein one of the loop invariant generation techniques uses fuzz testing and program syntax analysis to guess and check candidate loop invariants, and another of the loop invariant generation techniques is a counter-example guided loop abstraction refinement (CEGLAR) technique that havocs output variables of each loop subject to application of the another of the loop invariant generation techniques and applies induction to each loop subject to application of the another of the loop invariant generation techniques containing user properties to generate an abstracted loop; and display a verification result as one of a verification successful (S) when the one or more specifications hold for all program executions, a verification failure (F) when any specification from the one or more specifications failed to hold for at least one program execution, and unknown (U) when one or more of the specifications is not verified or the verification technique run out of time or memory.

11. The system of claim 10, wherein the one or more hardware processors are capable of executing programmed instructions to select a plurality of default verification techniques upon elapse of a respective predetermined period of time to verify a corresponding property by the plurality of verification techniques.

12. The system of claim 10, wherein the source code comprises the multiple return paths, wherein the plurality of verification techniques comprises one or more inter procedural verification techniques for the verification of the source code with the multiple return paths, the one or more inter procedural verification techniques comprising interval analysis followed by bounded model checking, wherein when the source code is not verified with the verification result as unknown (U), then a next verification technique in the predefined order is determined.

13. The system of claim 10, wherein a verification technique, from the plurality of verification techniques, for verification of the source code having the one or more loops with the unstructured control flow comprises random testing.

14. The system of claim 10, wherein a verification technique, from the plurality of verification techniques, for verification of the source code comprising the loops with arrays comprises a plurality of array abstraction techniques, wherein the plurality of array abstraction techniques comprises array pruning followed by loop shrinking, wherein the specification is verified with respect to a subset of array elements in the source code or the specification is verified with respect to loop iterations, wherein the plurality of array abstraction techniques validate user properties or assertions for a subset of array elements to verify the source code with an improved scalability, wherein when the array abstraction techniques run out of time and memory with the verification result as unknown (U), then a default verification technique is applied on the source code.

15. The system of claim 10, wherein when the abstracted loop produces a counter-example, likely loop invariants are checked to eliminate all paths leading to the counter-example and continued until the verification results in success (S) or failure (F).

16. The system of claim 11, wherein the plurality of default verification techniques comprises carrying out an execution sequence comprising interval analysis including a k-path interval analysis invoked twice, first with k=1 aiming at scalability and later with k=500 for precision, loop abstraction followed by bounded model checking (BMC) in which each loop is replaced by an abstract loop of known bounds, apply the BMC to the source code with bounds produced by the interval analysis to show absence of errors, loop summarization to analyze interleaving of unique paths within a respective loop to produce a disjunctive summarization of the respective loop to find errors or proofs, the bounded model checking is applied when the loop summarization is inconclusive and generates the unknown (U) verification result and performs a heuristic search for bounds that calls BMC multiple times asserting if all loops in the source code is unwound to invalidate an input property of the source code, and k-induction.

17. The system of claim 10, wherein the one or more hardware processors are capable of executing programmed instructions to perform the static analysis by carrying out an analysis of the one or more program features in a predefined sequential order.

18. The system of claim 10, wherein the one or more hardware processors are capable of executing programmed instructions to perform the static analysis by carrying out an analysis of the one or more program features in parallel.

19. One or more non-transitory machine readable information storage mediums comprising one or more instructions which when executed by one or more hardware processors cause:

receiving a source code encoded with one or more specifications to be verified, via one or more hardware processors;

performing, via the one or more hardware processors, static analysis of the source code to identify one or more program features of the source code, the one or more program features comprising at least one of multiple return paths, loops with an unstructured control flow, loops with arrays, loops with inputs of discrete values and numerical loops;

performing a structural analysis of a Plurality of loops and an interval analysis of input values read in the plurality of loops to determine a predefined order of a plurality of verification techniques to verify the source code based on the plurality of loops and a program control flow;

applying the plurality of verification techniques associated with the one or more program features to the source code for the verification, via the one or more hardware processors, wherein the source code comprises the loops with inputs of discrete values and numerical loops, wherein each verification technique of the plurality of verification techniques is applied for a predetermined period of time and in the predefined order, wherein a verification technique from the plurality of verification techniques for verification of the source code comprising the loops with inputs of discrete values comprises an explicit state model checking technique and loop invariant generation techniques and the loop invariant generation techniques result in loop abstraction, wherein when the explicit state model checking technique cannot scale, two loop invariant generation techniques are applied simultaneously, wherein one of the loop invariant generation techniques uses fuzz testing and program syntax analysis to guess and check candidate loop invariants, and another of the loop invariant generation techniques is a counter-example guided loop abstraction refinement (CEGLAR) technique that havocs output variables of each loop subject to application of the another of the loop invariant generation techniques and applies induction to each loop subject to application of the another of the loop invariant generation techniques containing user properties to abstract the loop; and displaying a verification result as one of a verification successful (S) when the one or more specifications hold for all program executions, a verification failure (F) when any specification from the one or more specifications failed to hold for at least one program execution, and unknown (U) when one or more of the specification is not verified or the verification technique run out of time or memory.

\* \* \* \* \*